(12) United States Patent
Stern et al.

(10) Patent No.: US 7,340,048 B2
(45) Date of Patent: Mar. 4, 2008

(54) SYSTEM AND METHOD FOR DIRECTORY SERVICES AND E-COMMERCE ACROSS MULTI-PROVIDER NETWORKS

(75) Inventors: Robert A Stern, Boxford, MA (US); Rod Drury, Mirimar (NZ); Sunny Ahn, Cambridge, MA (US)

(73) Assignee: Context Connect LLC, Newburyport, MA (US)

( * ) Notice: Subject to any disclaimer, the term of this patent is extended or adjusted under 35 U.S.C. 154(b) by 46 days.

(21) Appl. No.: 10/332,889

(22) PCT Filed: Jul. 16, 2001

(86) PCT No.: PCT/US01/22261

§ 371 (c)(1),
(2), (4) Date: May 15, 2003

(87) PCT Pub. No.: WO02/07050

PCT Pub. Date: Jan. 24, 2002

(65) Prior Publication Data

US 2004/0132433 A1 Jul. 8, 2004

Related U.S. Application Data

(60) Provisional application No. 60/270,304, filed on Feb. 20, 2001, provisional application No. 60/249,597, filed on Nov. 17, 2000, provisional application No. 60/239,570, filed on Oct. 10, 2000, provisional application No. 60/237,861, filed on Oct. 4, 2000, provisional application No. 60/218,469, filed on Jul. 14, 2000.

(51) Int. Cl.
*H04M 3/42* (2006.01)
*H04Q 7/20* (2006.01)

(52) U.S. Cl. ............... 379/218.01; 455/415; 455/428; 455/437

(58) Field of Classification Search ............... 705/50; 379/27, 218; 455/415, 428, 437
See application file for complete search history.

(56) References Cited

U.S. PATENT DOCUMENTS 4,734,931 A 3/1988 Bourg et al. ............... 379/93

(Continued)

FOREIGN PATENT DOCUMENTS

EP 238257 B1 11/1987

(Continued)

OTHER PUBLICATIONS

Heller, Mike; Cox, Ed, Phone number on the move; number portability; includes related articles; vol. 229, Nov. 13, 1995.*

*Primary Examiner*—Andrew J. Fischer
*Assistant Examiner*—Charles C. L. Agwumezie
(74) *Attorney, Agent, or Firm*—Blank Rome LLP

(57) ABSTRACT

The present invention solves the problem of cross-provider access proprietary information between unaffiliated and competing network providers, but not allow that information to be disclosed to competing providers. The invention provides a system that allows increased utilization and revenue by allowing information from one provider to be accessed and used to complete a transaction or make a connection with subscribers in another carrier or network system without that information being disclosed. The description of the invention for use in wireless or cellular directory assistance is for convenience and illustration of the features of the invention. It is to be understood that the invention has many embodiments and can be applied to any system where confidential and secure access to an entity or services are needed.

19 Claims, 8 Drawing Sheets

U.S. PATENT DOCUMENTS

| | | | |
|---|---|---|---|
| 4,879,747 A | 11/1989 | Leighton et al. | 380/23 |
| 4,979,206 A * | 12/1990 | Padden et al. | 379/88.01 |
| 5,204,894 A | 4/1993 | Darden | 379/88 |
| 5,239,557 A | 8/1993 | Bates et al. | 379/211.02 |
| 5,339,352 A | 8/1994 | Armstrong et al. | 455/414 |
| 5,349,638 A | 9/1994 | Pitroda et al. | 379/142 |
| 5,371,781 A | 12/1994 | Ardon | 455/445 |
| 5,404,506 A | 4/1995 | Fujisawa et al. | 707/4 |
| 5,425,102 A | 6/1995 | Moy | 713/183 |
| 5,442,703 A | 8/1995 | Kim et al. | 380/21 |
| 5,452,350 A | 9/1995 | Reynolds et al. | |
| 5,454,032 A | 9/1995 | Pinard et al. | 379/167 |
| 5,467,388 A | 11/1995 | Redd et al. | 379/210.02 |
| 5,483,586 A | 1/1996 | Sussman | 379/201 |
| 5,491,817 A * | 2/1996 | Gopal et al. | 707/200 |
| 5,509,049 A | 4/1996 | Peterson | 379/58 |
| 5,509,058 A | 4/1996 | Sestak et al. | 379/201 |
| 5,511,111 A | 4/1996 | Serbetcioglu et al. | 379/67 |
| 5,553,119 A * | 9/1996 | McAllister et al. | 379/88.01 |
| 5,668,955 A | 9/1997 | deCuitiis et al. | 379/130 |
| 5,689,547 A | 11/1997 | Molne | 379/379 |
| 5,689,700 A | 11/1997 | Miller et al. | 395/610 |
| 5,692,040 A | 11/1997 | Greenblatt | 379/350 |
| 5,734,706 A | 3/1998 | Windsor et al. | 379/142 |
| 5,749,052 A | 5/1998 | Hidem et al. | 455/406 |
| 5,768,360 A | 6/1998 | Reynolds et al. | 379/220 |
| 5,768,362 A | 6/1998 | Moon | 379/356 |
| 5,794,230 A | 8/1998 | Horadan et al. | 707/2 |
| 5,796,832 A | 8/1998 | Kawan | 705/65 |
| 5,799,066 A | 8/1998 | Joyce et al. | 379/88 |
| 5,802,066 A | 9/1998 | Miyake et al. | 370/527 |
| 5,802,510 A | 9/1998 | Jones | 707/2 |
| 5,805,830 A | 9/1998 | Reese et al. | 395/200.35 |
| 5,815,808 A | 9/1998 | Valentine | 455/422 |
| 5,841,854 A | 11/1998 | Schumacher et al. | 379/265 |
| 5,850,433 A | 12/1998 | Rondeau | 379/201 |
| 5,862,235 A | 1/1999 | Reed et al. | 395/200.31 |
| 5,862,325 A | 1/1999 | Reed et al. | 395/200.3 |
| 5,862,490 A | 1/1999 | Stuntebeck | 707/200 |
| 5,864,622 A | 1/1999 | Marcus | 380/23 |
| 5,864,840 A | 1/1999 | Levng et al. | 707/2 |
| 5,878,406 A | 3/1999 | Noyes | 706/65 |
| 5,893,107 A | 4/1999 | Chan et al. | 707/103 |
| 5,901,214 A | 5/1999 | Shaffer et al. | 379/220 |
| 5,901,352 A | 5/1999 | St. Pierre | 455/426 |
| 5,909,650 A | 6/1999 | Jonsson | 455/461 |
| 5,918,224 A | 6/1999 | Bredenberg | 707/2 |
| 5,922,074 A | 7/1999 | Richard et al. | 713/200 |
| 5,926,754 A | 7/1999 | Cirelli et al. | 455/414 |
| 5,926,810 A | 7/1999 | Noble et al. | 707/4 |
| 5,956,718 A | 9/1999 | Prasad et al. | 707/10 |
| 5,958,016 A | 9/1999 | Chang et al. | 709/229 |
| 5,974,130 A | 10/1999 | Sadri et al. | 379/210 |
| 5,983,095 A | 11/1999 | Cameron | 455/414 |
| 5,999,973 A | 12/1999 | Glitho et al. | 709/223 |
| 6,011,976 A | 1/2000 | Michaels et al. | 455/466 |
| 6,014,797 A | 1/2000 | Kuster et al. | 28/146 |
| 6,014,802 A | 1/2000 | Guerin | 29/407.01 |
| 6,035,190 A | 3/2000 | Cox et al. | 455/414 |
| 6,044,142 A | 3/2000 | Hammarstrom et al. | 379/223 |
| 6,044,205 A | 3/2000 | Reed et al. | 395/200.31 |
| 6,047,184 A | 4/2000 | Haces et al. | 455/445 |
| 6,049,712 A | 4/2000 | Wallinder | 455/414 |
| 6,049,799 A | 4/2000 | Mangat et al. | 707/10 |
| 6,052,372 A | 4/2000 | Gittins et al. | 370/396 |
| 6,052,579 A | 4/2000 | McCestabrook | 455/418 |
| 6,058,179 A | 5/2000 | Shaffer et al. | 379/220 |
| 6,065,016 A | 5/2000 | Stuntebeck et al. | 707/200 |
| 6,069,946 A | 5/2000 | Lieuwen | 379/220 |
| 6,072,867 A | 6/2000 | Lieuwen | 379/220 |
| 6,081,705 A | 6/2000 | Houde et al. | 455/411 |
| 6,081,898 A | 6/2000 | Miller et al. | 713/201 |
| 6,088,125 A | 7/2000 | Okada et al. | 358/405 |
| 6,088,717 A | 7/2000 | Reed et al. | 709/201 |
| 6,094,479 A | 7/2000 | Lindeberg et al. | 379/220 |
| 6,097,950 A | 8/2000 | Bertacchi | 455/432 |
| 6,101,541 A | 8/2000 | Ellesson et al. | 455/414 |
| 6,104,797 A | 8/2000 | Nabkel et al. | 379/201 |
| 6,104,802 A | 8/2000 | Perlmutter | 379/220 |
| 6,108,537 A | 8/2000 | Comer et al. | 455/426 |
| 6,122,359 A | 9/2000 | Otto et al. | 379/210 |
| 6,122,364 A | 9/2000 | Petrunka et al. | 379/265 |
| 6,128,503 A | 10/2000 | Granberg | 455/461 |
| 6,134,446 A | 10/2000 | Sasuta et al. | 455/456 |
| 6,138,008 A | 10/2000 | Dunn et al. | 455/414 |
| 6,144,671 A | 11/2000 | Purinpanathan et al. | 370/409 |
| 6,144,959 A | 11/2000 | Anderson et al. | 707/9 |
| 6,185,290 B1 | 2/2001 | Shaffer et al. | 379/220 |
| 6,366,913 B1 | 4/2002 | Fitler et al. | 707/9 |
| 6,396,920 B1 | 5/2002 | Cox et al. | 379/266.02 |
| 6,535,726 B1 | 3/2003 | Johnson | 455/406 |
| 6,546,002 B1 | 4/2003 | Kim | 370/351 |
| 6,633,633 B1 * | 10/2003 | Bedingfield | 379/201.11 |
| 6,870,921 B1 * | 3/2005 | Elsey et al. | 379/218.01 |
| 2001/0014598 A1 | 8/2001 | Cox et al. | 455/406 |
| 2001/0038624 A1 | 11/2001 | Greenberg et al. | 370/352 |
| 2002/0029178 A1 | 3/2002 | Wiederin et al. | 705/34 |
| 2002/0055351 A1 | 5/2002 | Elsey et al. | 455/414 |
| 2002/0118811 A1 | 8/2002 | Davis et al. | 379/218.01 |
| 2003/0007625 A1 | 1/2003 | Pines et al. | 379/223 |
| 2003/0007627 A1* | 1/2003 | Elsey et al. | 379/265.01 |
| 2003/0032412 A1 | 2/2003 | Cox et al. | 455/414 |
| 2004/0062371 A1* | 4/2004 | Maropis et al. | 379/114.2 |
| 2005/0002510 A1* | 1/2005 | Elsey et al. | 379/201.01 |

FOREIGN PATENT DOCUMENTS

| | | |
|---|---|---|
| EP | 334626 A2 | 3/1989 |
| EP | 372692 B1 | 5/1989 |
| EP | 599558 A2 | 11/1993 |
| EP | 647075 A2 | 9/1994 |
| EP | 689316 A2 | 6/1995 |
| EP | 782315 A2 | 12/1996 |
| EP | 817101 A2 | 7/1997 |
| EP | 823809 A2 | 7/1997 |
| WO | WO 02/11396 | 2/2002 |

* cited by examiner

SYSTEM AND METHOD FOR DIRECTORY SERVICES AND E-COMMERCE ACROSS MULTI-PROVIDER NETWORKS

RELATED APPLICATIONS

This application claims the benefit of copending U.S. Application Ser. No. 60/218,469 filed Jul. 14, 2000; Ser. No. 09/668,591 filed Sep. 22, 2000; 60/237,861 filed Oct. 4, 2000; 60/239,570 filed Oct. 10, 2000; 60/249,597 filed Nov. 17, 2000; and 60/270,304 filed Feb. 20, 2001, which are all incorporated here in their entirety.

FIELD OF THE INVENTION

The present invention relates generally to an information system, and more particularly to a system and method for directory services across multi-provider networks, and providing said service by use of subscriber managed context association.

BACKGROUND OF THE INVENTION

Individuals and institutions are in constant need of information and access to each other and to services worldwide. This critical need for information and access is seemingly limitless and ever present as a consequence of technological advances in communication and connectivity. Nowhere in our society is this need more strongly felt and observed than by Internet and wireless or cellular telephony users everywhere, however, no system is available to serve their needs.

Due to the demand for information, directory assistance is one of the fastest growing segments of the traditional wireline telephone industry. Revenues have exceeded three billion dollars with an estimated call volume in excess of 8 billion inquiries per year. However, the traditional wireline industry is rapidly coming under competitive pressure for use and convenience from the wireless industry.

The cost of service for wireless communication is dramatically decreasing while the features provided are increasing. In addition, wireless communication can offer benefits that wireline cannot. These include 24-hour access in any location, insignificant or non-existent long distance and roaming fees, and in some cases number portability.

The problem with wireless communication that is addressed by the present invention is that there is currently no method for wireless subscribers to engage in commerce by use of their wireless phone number or to access a subscriber, or the number of another wireless subscriber in the same or desperate provider network. This is a significant problem, since wireless service providers have seen the number of domestic subscribers increase to the current 72 million, all without a listing in a directory assistance. Wireless subscribers include traveling professionals, small independent business people, parents, children and "nomadic" students, each with specific needs for connectivity and information, but all of which are entirely inaccessible to the general population unless an information source is developed.

Another problem with traditional telephone directories is the constant demand to maintain and update the called party data. Presently, directory information is limited to traditional wireline services and further limited to include only names and telephone numbers. Due to the dramatic escalation in wireless pre-paid and post paid subscribers and the ever-increasing mobility and demand for services of these subscribers there is an enormous demand for accurate and up-to-date subscriber data, which is addressed by the present invention.

Another problem with traditional telephone directories is obtaining the desired number of the person or company you wanted with only limited information of their identity. In 1997, AT&T introduced 00Info. This service was exclusive to AT&T customers only as an alternative to existing directory services such as "411" and "555-1212" and provided access to local and national numbers as well as address and zip code information. As an additional service, AT&T customers could search for a listing by just the spelling of the listing. In 1998, Sprint began to offer their customers national listings in over three thousand communities, and MCI introduced 10-10-9000 for both MCI and non-MCI customers.

Although these systems provide telephone number and some limited address information, none can provide directory access to wireless telephone subscribers, provide subscriber selected information back to a caller, or direct communication to the subscriber to selected locations such as a home telephone, cell phone, email address, facsimile device, subscriber managed contact information, or e-commerce transaction streams, all of which and more are addressed and solved by the present invention.

SUMMARY OF THE INVENTION

The present invention solves the problem of cross-provider access proprietary information between unaffiliated and competing network providers, but not allow that information to be disclosed to competing providers. The invention provides a system that allows increased utilization and revenue by allowing information from one provider to be accessed and used to complete a transaction or make a connection with subscribers in another carrier or network system without that information being disclosed. The description of the invention for use in wireless or cellular directory assistance is for convenience and illustration of the features of the invention. It is to be understood that the invention has many embodiments and can be applied to any system where confidential and secure access to an entity or services are needed.

In one embodiment, the invention solves the problem of cellular directory assistance and the need for subscriber directed telecommunication by providing wireline and wireless listing inquiries by means of a context association cellular directory assistance system for a nominal fee.

In one aspect of the invention, a cellular phone subscriber's web-managed context association such as, but not limited to, an alpha numeric string, is used as a unique address to locate and provide information, access, or both to a calling subscriber. To place a call or provide access to the subscriber, the invention associates a subscriber with a cellular phone number by context association. The subscriber manages context associations on the web, by telephone, short message(SMS), or any other means to access the listing creation mechanism, with conventions that are established 333 by each subscriber. The invention provides for selectable levels of security allowing the subscriber to determine access and identification at all times. In addition, companies or institutions, and subscribers can group subscribers into communities for internal or external access as required.

Each community can provide its own context associations for its subscribers, allowing them to be easily identified by pre-existing or specifically created conventions. Other members of that community can therefore easily find a subscriber, which make up the subscriber's calling universe or circle. Accordingly, the present invention goes beyond one-to-one relationships between a phone number and a user by providing context associations and relationships between a subscriber and its community.

BRIEF DESCRIPTION OF THE DRAWINGS

For the purpose of illustrating the invention, there is shown in the drawings a form, which is presently, preferred; it being understood, however, that this invention is not limited to the precise arrangements and instrumentalities shown.

DETAILED DESCRIPTION OF THE INVENTION

Figure 1:
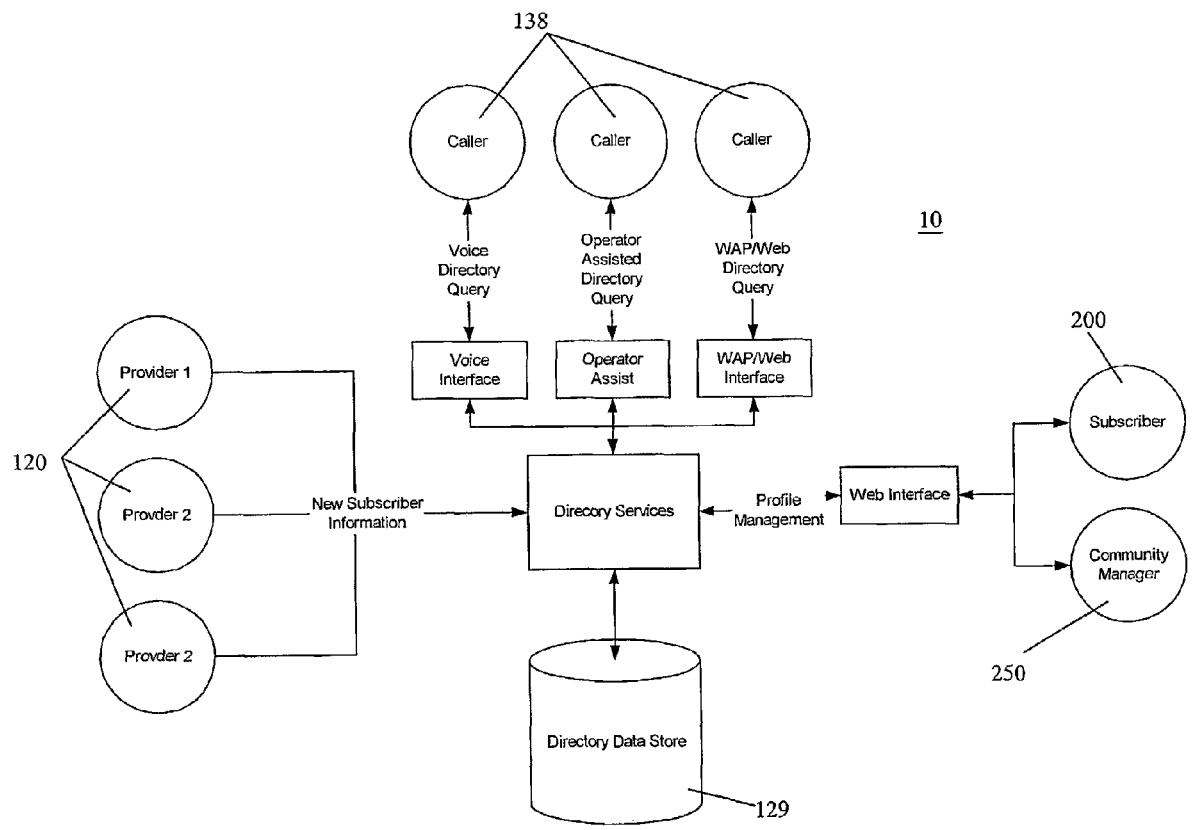
FIG. 1 illustrates a cellular directory assistance system according to one embodiment of the present invention.

Referring now to the drawings, wherein there is shown in FIGS. 1 through 4 an illustration of the present invention embodied in a wireless or cellular directory assistance system according to one aspect of the present invention. The terms wireless and cellular are used interchangeably.

Wireless Directory Assistance

Figure 2:
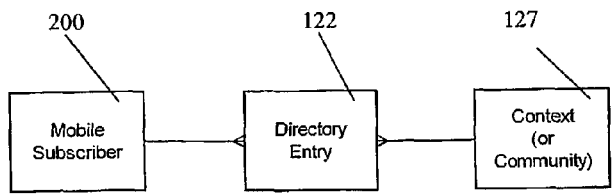
FIG. 2 illustrates a high-level data model according to one embodiment of the present invention.
Figure 3:
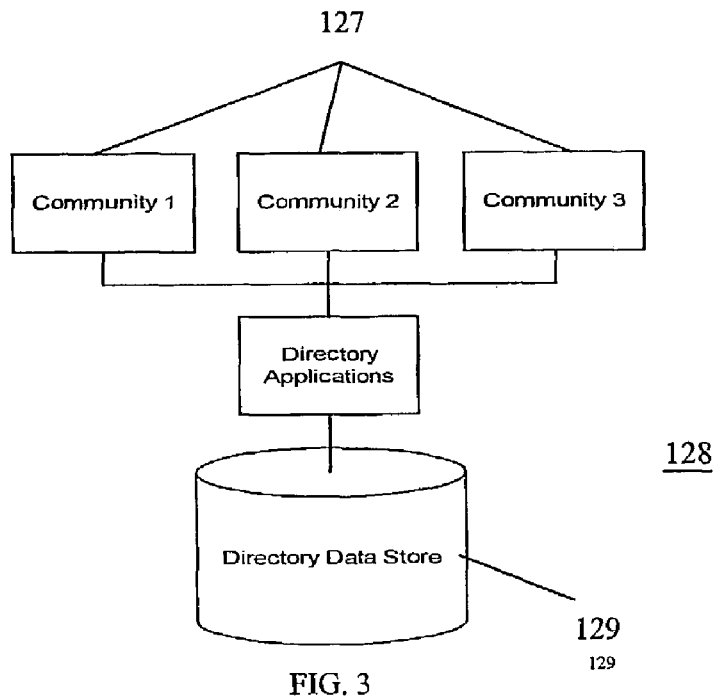
FIG. 3 illustrates a model for context data to be stored and analyzed according to one embodiment of the present invention.

In FIGS. 1 and 2 illustrate a wireless directory assistance system 10 and a high-level data model illustrating the context relationship between a subscriber and its community according to the present invention. A context includes, but is not limited to, a domain of predetermined conventions that are associated with predetermined individuals (subscribers) or predetermined services and used to locate subscribers by means of users (callers) having discrete knowledge about characteristics or conventions relevant to the individual or service desired. A subscriber can be an individual, company, bank account or service that is targeted or desired by the caller or user of the method and system.

Figure 4:
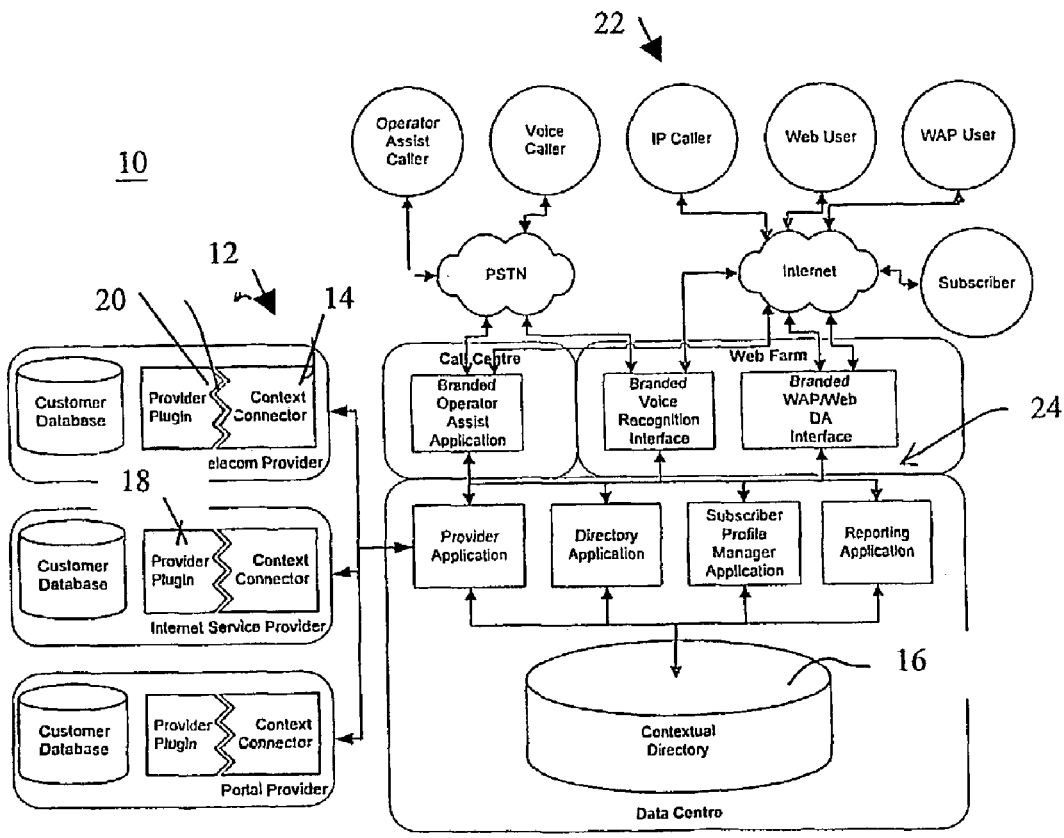
FIG. 4 illustrates another model for context data to be stored and analyzed according to one embodiment of the present invention.

In FIG. 4 a high level architecture 10 of the invention is shown applied to a directory assistance system. The left side 12 of the diagram represents the relationship with a partner provider, whether telecom, internet or portal. A component called the 'context connector' 14 is installed at each partner provider. This component provides the interface to a contextual directory 16. The provider plugin 18 is a custom application that is developed with the assistance of the partner provider to interact with the partner provider's subscriber (customer) database. The context connector 14 can be configured to hide the actual contact number, and creates a private and secure link through use of a key between the directory assistance system and the subscriber (customer) database. This key is made available to the contextual directory 16.

The context connector 14 is also used to receive a resolved directory lookup 20 into the partner provider's network where the key is resolved and the call or service is placed.

The top part of the diagram illustrates the various interfaces 22 available to the users (callers) of the service. There are multiple interfaces (Voice Call, Web, WAP) available to the service. Both the telephone network and the internet can be used. The center of the diagram illustrates the components 24 making up the directory assistance application. These include an application that manages the interfaces to the partner providers and provides the directory lookup. The application allows the data in the directory to be managed by authorized users, context administrators, and subscribers. There are also various reporting and billing applications. An important feature of the directory application is that the contextual directory 16 can store the information for subscribers and their contexts. The invention includes a method for providing information to a subscriber having the steps of associating a subscriber with at least one predetermined context. Association with at least one context then accomplishes location of the subscriber. Access to the subscriber is provided when at least one context is located.

In one aspect of the invention, at least one context includes at least one subscriber fact such as, but not limited to, a phone number, address, nickname, identification number or job title. The context also includes a context key that broadly defines a subscriber or group of subscribers such as a company or department name or geographical location that is used to locate at least one subscriber. The context key includes a domain of predetermined conventions such as a type of business or service or any desirable characteristic that may be desired to associate a subscriber, or individuals, or services, or some combination thereof.

Secure Identity Key

Figure 6:
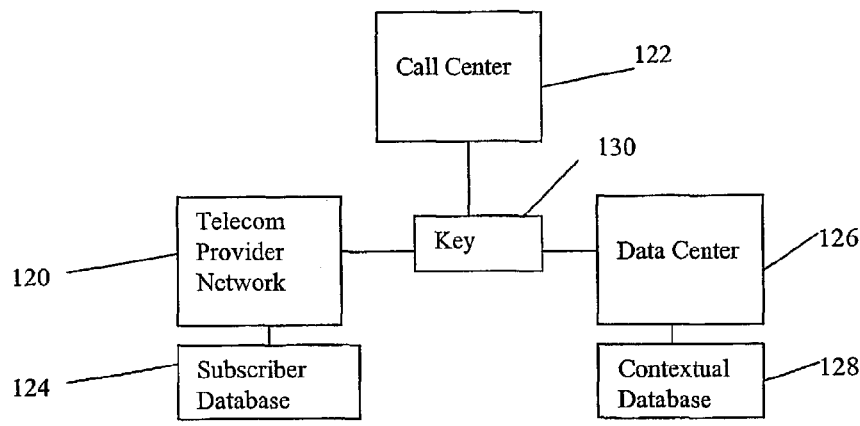
FIG. 6 illustrates major system components of the directory assistance system according to one embodiment of the present invention.

Referring to FIG. 6, security is another feature of the invention that is provided by a secure identity key 130. The key 130 is used by the system 10 for associating contextual associations of the subscriber in the contextual database 128 with contact information of the subscriber in the subscriber database 124 of the provider network 120. Callers or users having discrete knowledge of the context listing of the individual (subscriber) or service can reach the subscriber, but will not have access to the provider network 120 or any proprietary information about the subscriber, such as identity or telephone number unless authorized by the network provider 120. Although the context associations listed in the contextual database 128 are freely selectable by the subscriber or provider network 120, the secure identity key is controlled by the network provider 120.

Subscriber Statistics

Revenue and statistic generation is also a feature of the invention and is accomplished in a number of ways. For example, a charge to a user or subscriber may be charged or collected when access or information is provided or requested or when at least one context is located. Billing can be acquired from the callers' service provider. The billing agent of the callers' service provider would then forward the fee to the directory assistance system of the present invention which would provide a suitable percentage to the provider network 120 for the extraction of the subscriber contact information.

Access to a subscriber may be provided by acquiring a list of predetermined subscribers, associating at least one predetermined context for each predetermined subscriber on the list, locating at least one context, and then providing access to one or more predetermined subscribers on the list when at least one context is located.

In another aspect of the invention, access to a subscriber can be provided by establishing a list of predetermined contexts, establishing a list having at least one predetermined subscriber, associating at least one predetermined context for each predetermined subscriber, locating the at least one context, and providing access to one or more predetermined subscribers when at least one context is located.

Associating a predetermined subscriber with at least one predetermined context can be used to provide access to a subscriber. This may be accomplished by locating at least one context, and providing access to the predetermined subscriber when at least one context is located. The context includes network provider and/or subscriber determined terms for association with the subscriber. Association with the subscriber is accomplished when the context is within a domain of conventions that are associated with individuals or services for locating subscribers by users with discrete knowledge about the individual or service desired.

An enhanced directory allows subscribers, users, community managers and providers the ability to determine their context listing and to selectively manage that listing. For example, a person might be known as "John Smith at Your Corporation", "John at Your Soft Ball Team", or even "Dad at My Family". The subscriber, network provider or subscriber group manager can change these context listings as required. Another feature of the system also allows the caller 138 seeking a connection to contact the directory service and establish the context of the required listing. The enhanced directory can further include a demographic database, and the methods could use or require demographic information for the subscriber.

Subscriber Groups

There are a number of benefits to the proposed system.
1. People can be found by their "context". It is easy for people "within the context" to contact their members. For example, a Softball coach can quickly get a hold of his or her team.
2. The system can restrict knowledge of the subscriber's phone number. The subscriber can be contacted without revealing the subscriber's number. The system allows the subscriber to remove himself from a community and therefore remove unwanted calls without changing the subscriber's phone number.
3. Implementing these "contexts" makes the directory a suitable platform to leverage advanced network features like call groups and conferencing, as well as offering new tariff models and creating 'one to many' revenue streams.
4. The directory becomes a highly valuable information source of people grouped by their interests.
5. Providing applications for communities to manage their members creates an opportunity for cellular operators to provide a value-added service that will drive new connections or convert competitor connections to their service, virally, by empowering the community administrator.

Subscriber Managed Context Association

Management of individual or group contexts or profiles (a person can belong to multiple contexts) is made available over several interfaces such as a wireless phone or the internet. One advantage to subscriber access is that there is almost no cost associated with subscriber-based maintenance of listings. In addition, "community administrators" can manage their own communities. For example, the coach of a Softball team may be the only person authorized to add members to the context.

The population of the directory then becomes viral, which means that community administrators enter their own communities. This provides unlimited expansion and additional value and incentive for target communities to increase connections. This viral model also makes it easier to sign up provider networks.

The database can provide the platform for a number of related applications. With all this attributed data stored in a single logical store, the store becomes very valuable.

Cellular provider networks send new subscriber information to the directory assistance system of the present invention. All interfaces use XML messaging or other computer languages so subscriber transactions can be automated between the invention and the cellular provider networks. In addition, the system can be used to develop data mapping for each major provider network.

Community administrators can add members to their community, and update member details. An individual subscriber can maintain a subset of their information as well. This feature provides the subscriber with the ability to remove itself from a community, thereby "de-listing" itself from the community.

This feature enables a value proposition for subscribers to reveal more of their profile, making their directory information more valuable.

Callers seeking directory assistance can enter the directory assistance system of the present invention through a number of channels. The caller can dial a branded provider or an independent directory information number to receive operator assistance. Or the caller can dial a number and use tones to navigate to the information they desire. The invention also contemplates user access by use of voice navigation. Callers can also search a web site for contact numbers of subscribers who have agreed to have their numbers listed by a particular context on the website. This web directory also includes a small web application that can be "framed" into a related community web site, if a related community website exists. Other interfaces like WAP (Wireless Access Protocol), or a HTML browser (like Web TV, Palm PCs and PlayStation 2), or a Voice Portal can easily be supported by the architecture of the present invention.

The invention opens the directory database to the internet and to wireless devices, allowing subscribers to manage the amount of directory context data they want exposed to the world.

Direct Connect

Another feature of the invention is direct connect cellular directory assistance, providing wireline or wireless access to any cellular phone subscriber. An inquiry would originate from either source, be received into the present invention's call center, and ultimately be connected to the requested party.

Direct connect cellular directory assistance can be accomplished by an operator of the present invention obtaining the pertinent information to be used for a contextual search for a subscriber. Pertinent information would include such things as name, city and state, and the cellular provider if available.

In addition, the direct connect directory assistance service is capable of receiving an automated (no operator) SMS (short message service) or WAP (wireless access protocol) based directory assistance query. The call center of the present invention locates the subscriber number (perhaps through contextual association) and a call switch creates the call legs without revealing the subscriber number to the automated inquirer.

Further, the direct connect directory assistance service can connect a voice or other communications transaction to one or many subscribers by receiving a contact request to a device (which may or may not be the voice device of the subscriber) and directing a call switch to connect the communication without revealing the subscriber contact number. Examples are: 1) sending a call request from SMS; 2) creating a call request through WAP; and 3) creating a call request on a PC internet browser.

One advantage of using the call switch to connect the communication is that if either the caller (inquiring party) or the called (subscriber) party is not available at the time of the call request (whether by voice, SMS, SAP or PC internet browser), the call switch can hold the call request until both parties are available and complete the connection by calling both parties at the time of mutual availability. Another advantage of the above scenario, communications can occur without requiring a phone (of either the calling or the called party) to have keys or a screen, and provides an internet calling model where calls are requested over the internet but delivered over existing voice networks.

Multiple Provider Networks

When a desired subscriber, service, or listing is found the operator directly connects the user or inquirer to the listing and the calling individual is charged for the connection and the call. This transaction is carried out without revealing the target subscriber's phone number or the Internet Protocol ("IP") address used by the computer attached to a TCP/IP network or fax number. This system thereby allows multiple providers to link their respective subscribers without revealing specific information about their respective subscribers. This maintains the security of the target subscriber's data so that the cellular provider networks maintain the value of their customer database. As digital platforms become the standard and Personal Communications Services evolve, the caller should at least reach a subscriber's voice mail. Prom that point a message could be left or if connection is established, the subscriber can give the subscriber's number to the caller.

A system for providing access to a plurality of subscribers is also provided by means of a directory and director. The directory includes addresses that are contextually associated with a predetermined subscriber or service. Each address provides access or information to one or more subscribers. The director provides access or information to one or more of the plurality of subscribers by associating one or more of the plurality of subscribers with at least one predetermined context.

The director provides statistics regarding the subscriber or service accessed, and can accept information from the associated subscriber that determines whether another can have access to the subscriber or provide information (contexts) about the subscriber. The director manages the information associated with a subscriber that determines whether another can receive information about the associated subscriber. By determining whether another can have access to the subscriber or receive information about the subscriber, the director can prevent (limit) association with the one or more subscribers.

A secure identity key that is either provided or created for the association controls association with one or more participants. The directory associates a secure identity key to at least one or more subscribers and can establish or collect a predetermined charge when access is provided or when at least one context is located. In another aspect of the invention, a system for providing access to a subscriber includes an associator, a locator and a provider. The associator associates a predetermined subscriber with at least one predetermined context. The locator is used for locating the at least one context, and the provider provides access to the predetermined subscriber when at least one context is located.

Another feature of the invention is single number internet access. This feature provides a fee per inquiry or fee per extraction internet based cellular phone number directory. Data would be provided from cellular provider networks through the same contractual arrangement as direct connect. Requested numbers would be transmitted and billed through e-mail via the Internet Service Provider ("ISP") rather than through cellular or wireline billing.

Internet access would be similar to direct connect in that there would be a need for a database control facility. The facility would not require the amount of space or staff that the direct connect center would require due to the state of technology and the definition of real time.

Under this scenario, real time could be as long as 5 to 7 minutes. This would allow the operator to handle a higher volume of calls. Also, the technology is available to "forward an inquiry" rather than having to re-type the information. It is envisioned that at some point in the future the operator would act only as a gatekeeper with the whole system being automated.

The process would be a currently recognized process. Inquiries would originate from a web page. The web page would explain to the customer that there is a fee for this service and that the inquirer will be billed via their ISP. The inquiry would be obtained through a point and click information box and transmitted directly to the center of the present invention.

Once the inquiry is received, it is forwarded to the appropriate cellular service provider network and a search made. If a match is found it is transferred either to the center of the present invention or directly to the inquirer via return e-mail. It would be at that point that billing takes place. Even if no match is found, a return message indicates that no listing was found and billing occurs.

Another feature of the invention is for use with a company maintained database. This feature provides the creation, maintenance, and cleaning of a corporate database. The present invention would contract with the cellular providers to develop a database consisting of all current and future subscribers. This is the database accessed when an inquiry comes in.

Changes in the service provider's customer listing are transmitted to the present invention's facility on a daily (possibly hourly) basis.

Under this scenario, an inquiry arrives, operators search the company database and a direct connect is provided if a match occurs. Billing is provided through the initiator's (caller's) service provider (wireline or wireless).

Analysis of requests would provide the information to tune the invention and provide additional services like 'last 10 numbers' or 'my favorite numbers'. Cellular provider networks would be compensated through a licensing fee or a fee plus a percentage of direct connects for listings of their subscribers.

Another feature of the invention is a direct connect platform by geographic region or area code. This feature consists of system operation by one entity for specific geographic region or area code grouping. An active national and international network of the invention would be achieved by the cooperation of local franchisees.

Each subscriber organization would need to contract with local or regional service provider networks for access to their database. Franchisees in other areas could access each other's network using the same process as any inquiry. Although the directory is currently based on cellular numbers, it can include any form of communication including, but not limited to, email, facsimile devices, Personal Digital Assistant ("PDA"), pagers and other electronic devices.

Another feature of the invention uses a Domain Name System ("DNS") model for cellular directory assistance by creating relational pathways to identify a person without using or knowing their number. Another feature of the invention provides a person with multiple directory entries based on their context. Another feature of the invention is a viral information capability that provides for subscriber selectable and definable information protocols enabling communities to define themselves and assign members into their directory. Another feature of the invention provides a base platform for other value added directory applications such as email directory, follow me, smart diverts, and interest matching. Another feature of the invention finds the digital address of any cellular phone, pager, PDA, or other communication device.

In an alternative embodiment, a user queries a Web site. By entering the context information, which may be done in a free-form or unstructured database interface, the user is given one or more potential associations. For example, a user (inquirer) might enter the string "Bob sailing California". If the context provides more than one possible match, the system can respond with additional context-based information relating to each possible match, such as employer, city of residence, other hobbies, etc. In addition, the directory assistance system, the user or the subscriber can screen or block positive absolute identifiers, such as the subscriber's telephone number, email address, physical address or the like.

Once the user (inquirer) has identified a desired subscriber on the website directory assistance system, the user then indicates that he wishes to be connected to such subscriber. This may be done by a single click on an appropriate icon. If the subscriber has more than one mode of contact (e.g., landline, mobile phone, facsimile, email address, etc.), a menu allows the user to pick the desired mode of contact. For telephone-based contacts, including facsimile, the user can be supplied with a telephone number and a unique identifier code. The telephone number may be a "1-900" number or other similar number by which the user (caller) is charged for the telephone connect time, which is automatically billed to the caller's provider. The user dials the telephone number, and upon automated system answering, enters the unique identifier number. The system then translates the unique identifier code to the appropriate telephone number of the subscriber, and connects the user to the subscriber.

The unique identifier code may be set so that it is valid only for a specified period of time, such as twelve hours, twenty-four hours, or so on. After the expiration period of the unique identifier code, the user must again employ the internet-based directory assistance system and obtain a new unique identifier code for the subscriber. Alternatively, the unique identifier code may be permanent, but the subscriber may have the option, at any time, of canceling or deleting the unique identifier code. If the subscriber deletes the unique identifier code, and also changes or deletes context-based information, the subscriber cannot thereafter be reached by a user employing the same context-based information.

For e-mail connections, there can be a charge to the ISP. Alternatively, a credit-card based account system may be established, whereby a user is charged a fee for each email transmitted. The email may be transmitted to a specified address including the unique identifier code and appropriately routed to the intended subscriber.

E-commerce and Revenue Generating Transactions

Figure 9:
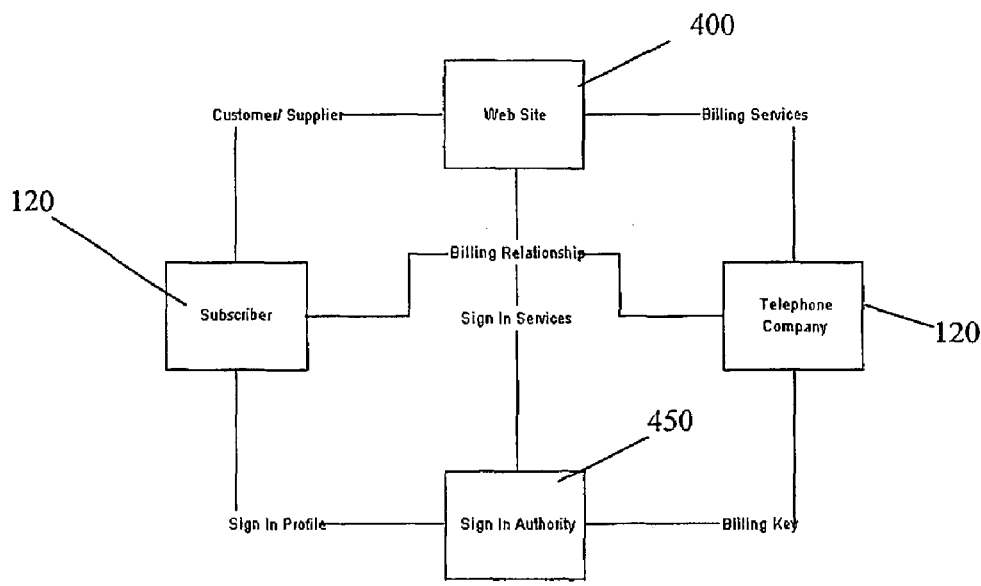
FIG. 9 illustrates a relationships overview of components of a method of e-commerce transactions, in accordance with one embodiment of the present invention.
Figure 10:
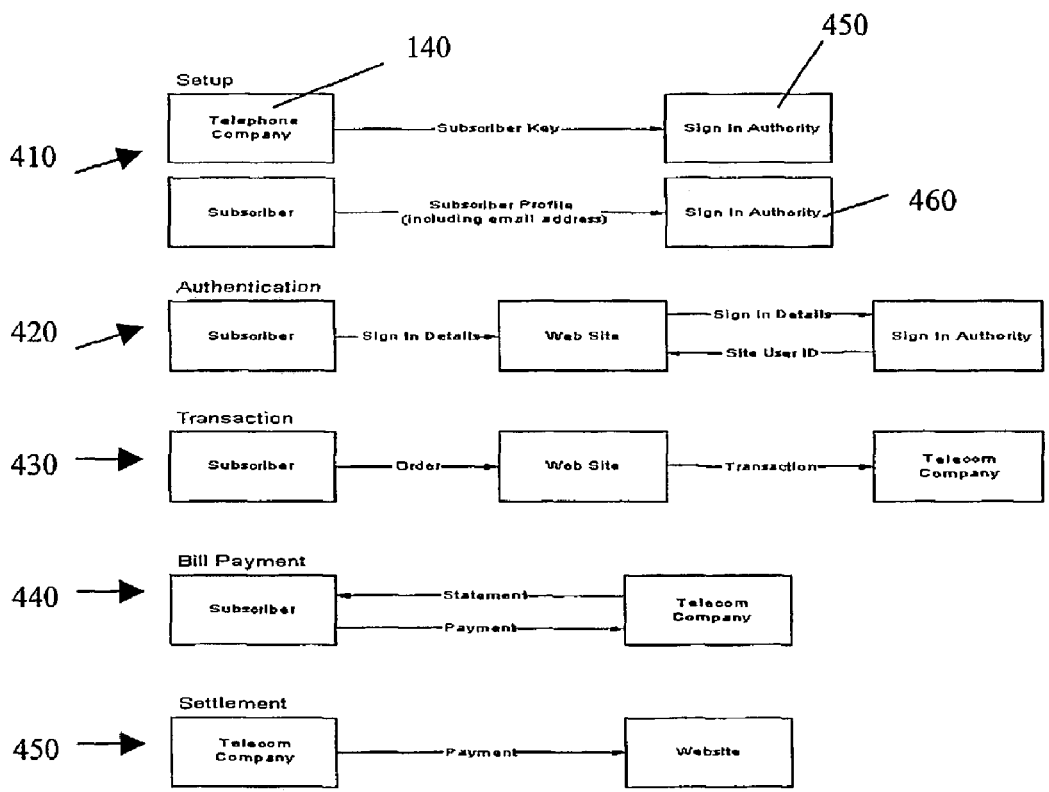
FIG. 10 is a flow diagram illustrating the method of e-commerce transaction of FIG. 9.

The present invention 10 includes a method of commerce for internet e-commerce transactions, which is illustrated in FIGS. 9 and 10. As shown in FIG. 9, a network provider 120 maintains a billing relationship with its subscribers 200, which can include standard billed subscribers or pre-paid card or telephone users. The billing relationship with the provider is used by the system 10 to facilitate e-commerce expenditure by means of a subscriber email addresses, which is connected and linked to the subscriber 200 by the context listing 128.

Background

E-commerce web sites usually require transactions to be paid with a credit card, and the user is typically identified to the web site by an email address and password. The present invention 10 allows network provider 120 to use their significant billing competencies, infrastructure investments and customer billing systems to earn revenue. Network provider billing systems are accustomed to handling high volume lower value transactions. At the heart of the network provider-billing system is the phone number, which is recorded for each call. By means of the subscriber identification key 130, network provider customer data can also be made available without loss of security, provider proprietary information or subscriber confidentiality.

Solution

The present invention provides a method for exploiting telecommunication network provider billing systems and the context directory assistance system 10 to conduct e-commerce transactions. This is accomplished by linking the subscriber email address (or other online identifier) with its telephone number by means of a pre-assigned secure identity key 130. The key 130 allows the network provider 120 to bill e-commerce transactions to a subscribers telephone bill without the subscriber's (e-commerce purchaser's) phone number being revealed to the e-commerce merchant.

The flow of the e-commerce transaction is shown in FIG. 10. At sign-in 410, security for the transaction is provided by a process that establishes the relationship between the subscriber 200 with an email address, the network provider 120 with a phone number, and the sign in authority 450. The sign-in process 410 is executed by means of a centralized authentication server 460. At the web site, the subscriber 200 completes the online contract and ensures their details are correct. Following authentication 420, affiliated web sites enable payment at their sites. When a purchase of this type is made a transaction is recorded by the sign in authority 450. The sign in authority 450 passes these transactions to the network provider 120. The network provider looks up the subscriber account based on the key 130 that is passed it by the system 10 for authorization of the transaction. These transactions are then billed to the appropriate subscriber and appear on the network provider's monthly statement. The Provider then reconciles the transactions and pays each of the affiliate web sites.

Pre-Pay Subscriber Directory Assistance

The present invention 10 also provides directory assistance for pre-paid subscribers 500 which is a major breakthrough for existing Directory Services since pre-paid subscriber data is often not collected or validated when the customer signs up for service In order to allow a pre-paid subscriber to interact with the context directory system 10 that maintains directory listings and other contextual listing information, it is necessary to verify the identity of the pre-paid subscriber. This process is normally straightforward for "post pay" subscribers—people who have an established account with a provider. The process is more complex for an initial prepay subscriber. The provider often has very little information about the prepay subscribers that can be used to independently verify its identity. A few examples of initial pre-pay subscriber methods are provided.

Method 1: SIM Card Number

Many wireless phones, particularly GSM, have a SIM card that uniquely identifies the phone to the network. This SIM card has a globally unique number both electronically encoded on the card, and physically printed on it. Therefore, when accessing any service that allows creation, modification or deletion of contextual information it may be possible to verify that the subscriber has control over the phone number by requiring them to enter the SIM card number associated with that number. This method includes the following steps:
  1. Subscriber purchases a prepay phone (with SIM card),
  2. Subscriber is notified, or otherwise gains knowledge about the directory service,
  3. Subscriber accesses the directory assistance service (via phone, internet or any other interface the directory assistance service offers),
  4. Before allowing maintenance of listing and other contextual information, the system requests the subscriber to enter the number from the SIM card,
  5. A password can be sent to the associated mobile phone for verification,
  6. The system matches the SIM card number with records of valid SIM card numbers and their associated phone number, and
  7. The subscriber may now continue with maintenance of their directory listing profile.

Method 2: Authorization Code Text Message

Many wireless networks have the facility to deliver text messages to and from phones. When accessing a service, the network providing the service could request from the subscriber the phone number or SIM card number. The system can then deliver a text message to the phone. The content of the message would be a randomly generated unique access code. The system can then verify that the subscriber has control over the pertinent number by requiring entry of the access code. This method includes the following steps:
  1. Subscriber purchases a prepay phone (with SIM card),
  2. Subscriber is notified, or otherwise gains knowledge about the directory service,
  3. Subscriber accesses service (via Phone, internet or any other interface the directory assistance service offers),
  4. The system sends a text or voice message to the phone number (identified by SIM card number). The content of the message is a unique random access code.
  5. The subscriber provides the access code to the system via phone, internet, computer link or SMS message, and
  6. The subscriber may now continue with maintenance of their directory listing profile.

Method 3: Account or Other Personal Information

When a subscriber is post-pay, or the service provider has other information about the prepay subscriber that would only expect to be known by the person in control of the phone, the system may request that information before allowing the subscriber to proceed with maintaining their profile. This method includes the following steps:
  1. Subscriber purchases a pre-pay phone (with SIM card),
  2. Subscriber is notified, or otherwise gains knowledge about the directory service,
  3. Subscriber accesses service (via Phone, internet or any other interface the directory assistance service offers),
  4. Before allowing maintenance of listing and other contextual information, the system requests the subscriber enters some item of information that the person who purchased the phone/SIM card (or has control of the phone) would only reasonably be expected to know,
  5. The system matches this information with records of valid SIM card numbers and their associated personal information, and
  6. The subscriber may now continue with maintenance of their directory listing profile.

Community Managed Context Services

The contextual directory 128 also provides management of community groups and can exploit advanced call network features like group broadcast messaging and conference calling without the need for individual searches for subscribers.

As the listings are inherently structured, communities of users are formed. By means of the web 230 application, community managers can be assigned to maintain individual or group subscriber context and connection information relating to their community. Data available to community managers will include all data elements defined for that community. Community managers will have the ability to add, change or delete data elements, community attributes or community members.

EXAMPLES

The following are examples that illustrative various implementations of the present invention. These examples are not exhaustive and do not represent any limitation on the scope of the invention or other possible alternative embodiments.

Example 1

Wireless Directory Assistance

Background

A directory is important to any application, on any platform. Directories store information about people and resources. High value applications, especially those in a communications network, rely on the directory as a foundation for all applications. In the telecommunications industry, however, directory assistance is based on old models of proprietary control and olds methods limited to name, city, state and country look up. The present invention solves the problem of subscriber access and provides a variety of contact connections and source of services. For example, mobile and wireline customers can take advantage of the present invention's features, which provide directory, communication and commercial services over the telephone.

The Problem

Existing directory services have not kept pace with the multitude of new communications devices. This is especially true for mobile phones and Internet Protocol (IP) devices. These directories have evolved from a system of local monopoly networks that were not focused or attentive to consumer demands and diversified services. The lack of subscriber directory services for mobile devices demonstrates that the old directory model lacks the flexibility and features to attract mobile listings and usage. There are several key reasons for this.

1. In traditional wireline systems there is typically a single provider with a single directory in one region. In each region, the directory belonged to the one provider and concern for competition for subscribers was not a factor. In wireless systems there may be many regional providers competing for the same subscriber base, so a single provider directory will not work. Mobile directories must be multi-provider and broadly available.

2. As there are several providers servicing the same customer this raises the concern on the part of providers for customer retention and security, and the concern of subscribers for multi-provider directory service.

3. Mobile devices have been considered personal and intrusive. In some countries the receiving party pays, so subscribers need greater control in their listings to give them privacy and flexibility. The present invention addresses and solves this problem.

4. Mobile devices lack a context in which an inquiry can be made. A physical address is not relevant to a mobile device, and people do not often know the address of the subscriber they are trying to call. The present invention addresses and solves this problem.

5. The rise in use of pre-pay subscribers means that network operators often know little about their subscriber base and they have no method in which a prepaid subscriber can participate in a directory service or be located. The present invention addresses and solves this problem.

The Solution: Contextual Directory

A contextual directory is a new type of mobile directory assistance service. It provides a natural way for people or resources to be found based on identifying them in a known community or context with structured word driven listings. Further, by allowing partial or complete self-management of the contextual directory by the subscriber or some other party, the directory listing will be more accurate and available for regular subscriber and transient subscriber users alike.

A contextual-based directory assistance solution allows individuals to find and connect to wireless subscribers across multiple telecommunications network providers (AT&T, Verizon, Telstra, etc.) and devices (mobile phone, WAP, PDA, PC, standard telephones, etc.) A subscriber can have multiple listings, which would allow the subscriber to be found by multiple contexts and ways. A listing can be the person's identifier—name, alias or position, within a context. A subscriber will have at least one contextual listing selected by the subscriber. Some examples of contextual listings include:

| VERBAL LISTING | FORMAL LISTING NOTATION |
| --- | --- |
| WildMan in Wellington | Wildman@Wellington.Region.NewZealand |
| Golfer at Pebble Beach | Golfer@Pebblebeach.Monterey.NorthernCalifornia.Region.USA |
| Joe Smith in North Ryde, Australia | Joe.Smith@NorthRyde.Sydney.NSW.Region.Australia |
| Rod at Context Connect | Rod.Drury@ContextConnect.Corporate.USA |

Unlike telephone numbers or an address, a contextual listing is easy to verbalize and remember. The advantage of a contextual listing is that it provides inherent security, they are stored in a formal structure, enabling directory automation. The contextual directory, comprised of contextual listings, is much easier and more simple to use, is very flexible, easily updateable, and provides privacy and therefore will dramatically increase connectivity over all network providers.

The advantage of contextual listings, including its ease of use and the implementation of secure connectivity according to the present invention, will greatly drive up connectivity demand across multi-provider networks as it securely maintains and protects proprietary subscriber information. The features of the present invention are further enhanced by the power of the subscriber's provider network or the internet, allowing subscribers to maintain their own listings and add other features to their service such as billing paying, shopping, parcel delivery, banking and other applications that add value to and increase use of their network provider service.

System Overview

Figure 5:
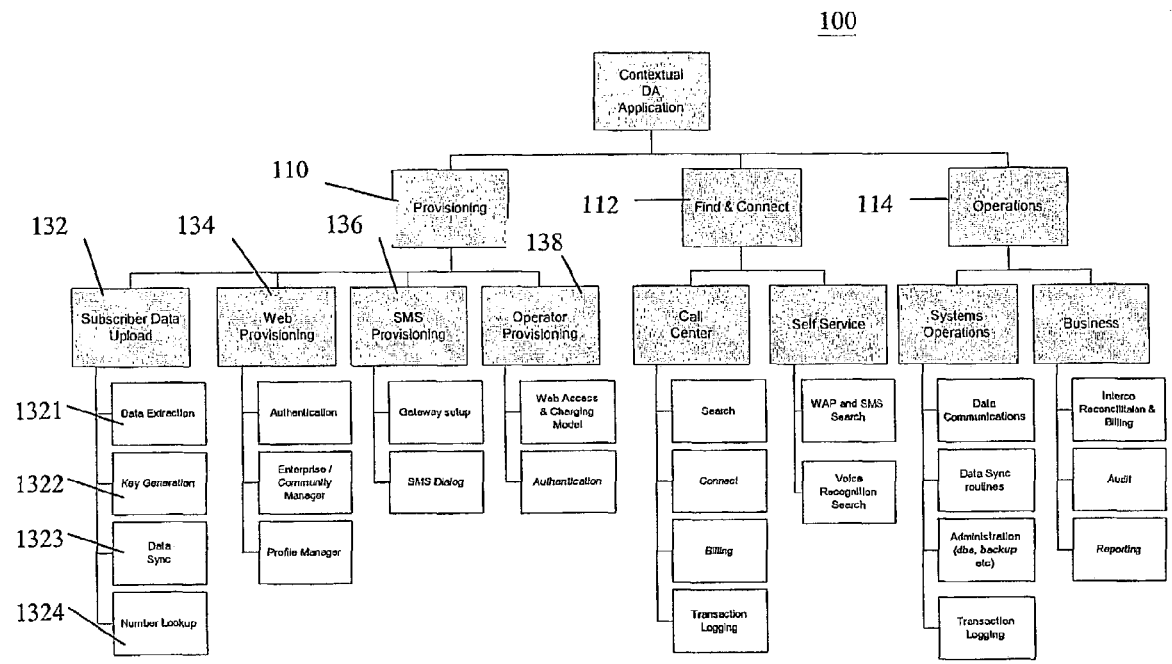
FIG. 5 illustrates a functional diagram of the directory assistance system according to one embodiment of the present invention.

A functional diagram of the directory assistance system 100 is illustrated in FIG. 5. The system 100 has main functional elements for operation of the system. These main elements include Provisioning 110, allowing a user to create and manage its own listings, Find & Connect 112 for providing directory assistance service so that users can connect to a device, service or subscriber, and Operations 114 for providing management and administration of the service. These main functional elements are implemented by several systems components, which are illustrated in FIG. 6.

The system components include at least one telecommunication provider network 120 where subscriber billing information is collected, pre-paid services are managed, and calls are switched to a call center 122. At the call center 122, calls are accepted and an operator function is available to assist the caller with database searches. When the subscriber is located, the call is routed back to the caller's network for connection to the required party. In the subscriber number database 124, a network operator function provides a regular extract of subscriber information required to operate the system. At all times proprietary subscriber data remains secure within the telecommunication network 120. The data center 126 contains the contextual directory database 128 and performs the associated provisioning 110 and operations 114.

Secure Identity key

Within each provider network 120, a subscriber database 124 is maintained containing all of that network operator's subscriber numbers and associated keys 130. The key 130 is the unique alphanumeric identifier, generated by the subscriber database 124 which can only be used by the network provider 120 to associate either the subscriber or the subscriber's wireless number. Whenever the subscriber or the network provider creates a contextual listing, it is associated with that subscriber's (or number's) key 130 are also created and provided to the data center 126 for associating the listing. Only the key 130 and the listing are stored in the contextual directory database 128 in the data center 126. The proprietary subscriber wireless number associated with the listing, however, remains securely in the network provider's subscriber database 124. Accordingly, the key 130 is a secure link between the provider network 120 and the contextual database 128, providing complete security for the proprietary subscriber data maintained in the subscriber database 124.

This architectural approach is designed to allow a directory assistance call center 122 to operate without requiring the provider network 120 to provide the subscriber's contact number to either the caller 140 or the call center 122. This approach eliminates the need to publish subscriber numbers or to provide them to other network providers. This is an important competitive consideration for network providers that view their subscriber database 124 as their most valuable network asset.

By maintaining subscriber number security, network providers would be encouraged to utilize call centers 122 to consolidate subscriber access across competitive subscriber networks over one consolidated service without the loss of control or revenue.

Example 2

Context Connection and Secure Identity key

Referring to FIG. 6, a caller uses the directory assistance system to connect to a wireless subscriber by dialing a call center 122. The call proceeds as a normal operator assisted directory assistance call. The caller would dial a short number to reach the directory assistance operator and request a connection to a called party. The subscriber can be an inter- or intra-network subscriber 200 having a context that is known to the caller and belongs to the person or entity the caller 140 wishes to reach. In this example, the context is "Marlies at Context Connect". The operator would then search the contextual directory 128 for the requested listing.

If a match is found, the key 130 stored with the contextual listing will be used to determine with which network provider the contextual listing is associated. The key 130 is then provided to the network provider to search in the subscriber database 124 for the corresponding subscriber's number. Having retrieved the number, the call is forwarded to the subscriber through the network provider 120. Alternatively, after retrieving the number, the calling party's call is dropped back to the caller's network for connection through the PSTN to the subscriber without connection through directory assistance network. The retrieved subscriber number is never made available to the calling party. The call center operator does not have access to the subscriber's number either. Only the context in which the listing party has established themselves is available at the call center 122.

Example 3

Provisioning Services

Referring to FIG. 5, the system 100 supports a range of provisioning 110 that allow subscribers to create and maintain their listings. The provisioning feature 110 includes:
1. Bulk provisioning from subscriber data held by operators 132,
2. Web portal subscriber self-provisioning 134,
3. SMS/WAP based subscriber self-provisioning 136, and
4. Operator assisted provisioning through the call center 138.

In general, each provisioning feature relies on subscriber data extraction 1321 from a network provider's customer care system, where the subscriber data is loaded into the subscriber database resident on a subscriber database server.

Generic Provisioning Process

Figure 7:
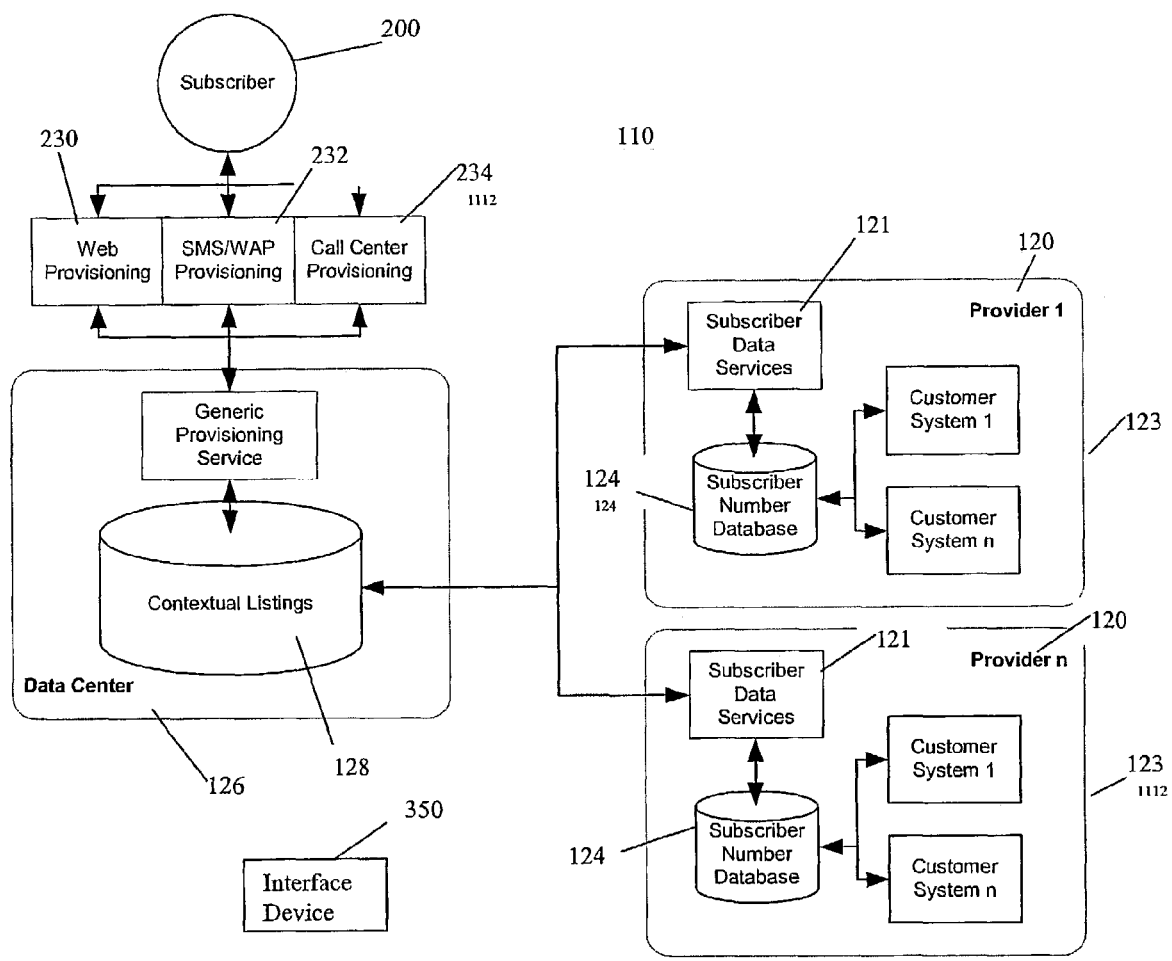
FIG. 7 illustrates an interface device with a directory assistance system according to one embodiment of the present invention.

An example of the elements of a generic provisioning feature 110 is illustrated in FIG. 7. The subscriber data extract process populates the subscriber database 124 with at least the subscriber number and a unique key 130. Each provisioning process will be required to authenticate the subscriber and access the subscriber database 124 with the subscriber number to obtain the unique key 130 associated with that number. Each provisioning process will execute the following steps:
1. Authenticate the source of the provisioning request,
2. Identify the operation associated with this provisioning request as Add, Change or Delete,
3. Acquire the subscriber's required listing text,
4. Parse the listing text for compliance to listing rules associated with the provisioning operation,
5. Acquire the number for the subscriber's listing,
6. Use the number to search the Subscriber Database for the associated key,
7. Submit the listing text, key and operator identifier to the Data Center for appropriate action, and
8. Report back to the originator, the result of the provisioning action.

Subscriber Data Upload Provisioning

Periodically the data center 126 will request an upload of new, modified or deleted subscriber information from the subscriber data services module 121 on the subscriber data server 123. Specific treatment of the subscriber data upload 132 is necessary to ensure a clear and smooth process for moving data from the provider network 120 into the data center 126. There are two situations where full uploads will be required at the initial extract from a new provider, and when network providers do not support more targeted updates. To handle this form of update, the first step is to establish whether the extract affects all records, or a subset of the provider database. To support this the extractor will need a "data source" field in the interface. Subscriber data upload 132 should check whether the subscriber data server 123 is available to perform a required transaction and report an error when the service does not respond.

Subscriber Self Provisioning and Profile Management

Through a Web 230, WAP/SMS 232, or call center 234 interface, subscribers 200 can manage their own details on the service. Data changed by subscribers 200 will cause an update of the information that the call center 122 accesses for searching. Different caller interfaces, display of button features, logos, provider information and identification can be made available for each network provider 120 so that the subscriber 200 perceives they are dealing directly with their own provider network to preserve the valuable commercial relationship.

Community Managed Context Services

As the listings are inherently structured, communities of users are formed. By means of the web 230 application, community managers can be assigned to maintain individual or group subscriber context and connection information relating to their community. Data available to community managers will include all data elements defined for that community. Community managers will have the ability to add, change or delete data elements, community attributes or community members.

Example 4

Find and Connect Services

Figure 8:
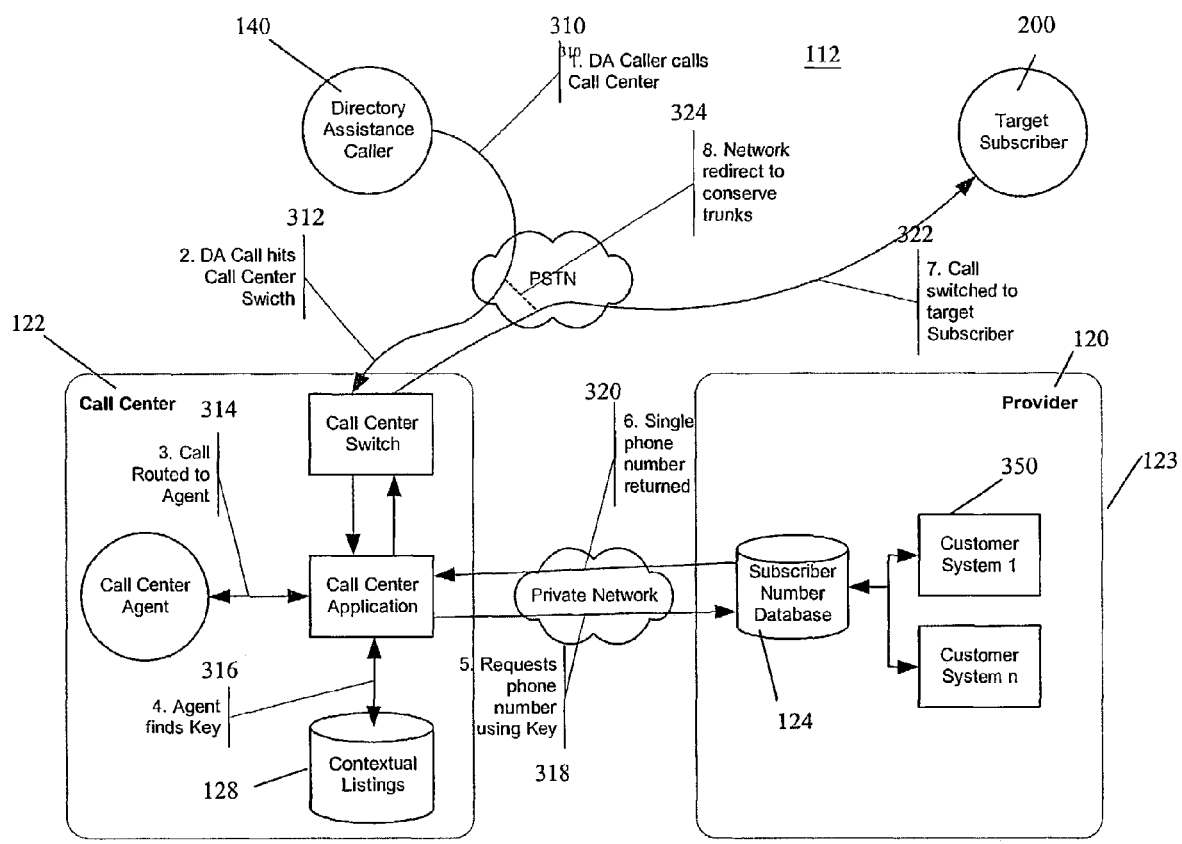
FIG. 8 illustrates a find and connect service associated with the directory assistance system according to one embodiment of the present invention.

The find and connect service 112 provides directory assistance services and connects the customers to a device, service or subscriber. An example of the find and connect service 112 is illustrated in FIG. 8. The steps for an implementation of connecting callers to providers using a contextual directory service are also shown in FIG. 8. It is to be understood that other implementations of the system are possible and may differ depending upon the technical requirements of the provider network 120.

In general, call routing involves at least one provider network 120 participating in the service, at least one call center 122 that answers the directory assistance call, a directory assistance caller 140, the caller 140 (whether person or entity) requesting contact with a subscriber 200. The targeted subscriber 200 is a person, group, or device that is listed in the contextual directory 128 and available to receive calls.

The call and information flow is as follows:
1. The directory assistance caller 140 makes a call to the service through the PSTN 310,
2. The call is routed through the PSTN to the call center 122 arriving at the call center switch 312,
3. The call center switch 312 receives the call and routes it to the appropriate agent 314 (at this stage IVR technologies can be used to begin the searching process by doing an initial filtering process),
4. The agent 314 takes the name and context for the search 316 (the search application on the agent desktop provides the search interface; the application does a number of background steps; the first step is to find the key value that matches the listing the agent has located),
5. The second step the search application performs is a query to the Subscriber Data Number Database 124 (of the provider that the key value belongs to) that matches the key value to a single phone number 318,
6. The third step is the receipt of the single phone number to the application 320,
7. That phone number is then used to connect the call 322 to the target subscriber 200 (at this point the switch may need to generate the appropriate billing records depending on the physical implementation), and
8. Where possible the call should be handled in such a way that the use of trunks and other network resources is minimized 324.

Extended Directory Services

The connectivity data provided by the subscribers 200 allows for extended directory services that can be charged to the network operator. These include:
1. The ability to charge for an operator sent email, optionally, without the target email address being known,
2. Operator initiated SMS, optionally, without revealing the target subscriber phone number,
3. Direct to Voice Message services, optionally, without the number being known,
4. Group messaging and conference call set up, based on the community connectivity information, and
5. Subscriber managed connectivity rules, based on calling party and time of day.

Community Managed Context Services

The contextual directory 128 also provides management of community groups and can exploit advanced call network features like group broadcast messaging and conference calling without the need for individual searches for subscriber.

Example 5

Subscriber Device Connectivity

Background

The contextual database also supports directory assistance and connectivity to an interface device 350 using Short Message Service (SMS) or Wireless Application Protocol (WAP) and voice recognition protocols. The system 10, through the structures that search for the target subscriber, provide the appropriate device protocol and data format as required by the interface device 350 for effective communication.

The Problem

The problem with these devices is that they provide caller identification, which may not be desirable for a multi-provider network. SMS and WAP protocols are designed to retrieve a phone number. In the present invention, however, the proprietary subscriber number is not stored in the contextual directory 128. Compounding this problem, are those instances when the target subscriber wishes to provide its phone number, which is not available from a call placed through a call center 122.

The Solution

This present invention, by means of its contextual listings 128, provides enhanced functionality to find and reference a subscriber without compromising the security of the proprietary phone number or identity of the subscriber. An illustration of a directory assistance system 10 for use with an interface device 350 is shown in FIG. 7. Any interface device 350 that is capable of constructing a message and connecting to a central telecommunication server can be used to initiate a call. For example, using a mobile phone and SMS or WAP, a request to connect to a person is constructed and sent to a central telecommunication server.

That message might contain the instruction to 'call John.Doe@hotmail.com'. The central telecommunication server can interpret the message and resolve the actual target number (B number) by looking up 'John.Doe@hotmail.com' and finding the matching phone number or pointer to a telecommunications service that can complete the call with this information. The central telecommunications server will know the identity (A number) of the calling party and can then place a call between the parties. The target phone number (B number) never needs to be revealed to the calling party (A number).

Using similar technology an internet user can construct a request to place a call on their browser. If the calling party is authenticated by the service, the telecommunication server receives the request and the calling party identity (A number). The telecommunications server 123 then looks up the target phone number (B number) using the information available from the call center 122 and completes the call to both parties.

Other Benefits

Telecommunication and internet services are converging through new mobile packet technologies such as General Packet Radio Service (GPRS) and Time Division Multiple Access (TDMA), which allow permanent IP connection between the phone and network. Taking advantage of this technology, the invention also provides the mobile interface device 350 with enhanced telephony interface through an HTML or WAP interface. By this feature, the invention can configure and provide a telephone or interface device 350 with additional functionality, directly upgrading such remote devices through the network provider server 123. Instead of replacing the interface device 350 with changing technology, the same device is merely reconfigured by the system remotely. Accordingly, new services and features can be rapidly deployed without the need to obtain additional equipment or cost.

This feature also provides a secure interface between the phone and telecommunications device so that more powerful devices such as computers and PDA's can easily construct calls (and other telecommunications transactions) with simpler devices such as a telephone or facsimile machine. As an example, existing analogue devices can be used to receive calls initiated from other more sophisticated devices, such as a small bandwidth wireless PDA.

Implementation

As an example, instead of a handset dialing a number directly, the device sends a context message to the server. These messages might be encoded but might be simple messages like 'call 617 1234 4567' which is sent to a smart switch. The switch knows who sent the message, understands the method 'CALL' and understands the parameter '617 1234 4567'. Using this information the switch completes the circuit by seeking a connection to a subscriber 200 as described in the call method described here.

Examples of a context message are:

1. Call Sunny at Context Connect,
2. Conference Call, Rod, Sunny and Bob
3. Divert to Office until 9:00 PST
4. Send an email to Rod, "Lets make lunch 12:30 Tuesday"

An example of an XML message is:
   <message>
   <method>Ringback </method>
   <target match="Phonebook|Number|Directory">Bob </target>
   <expiry uom="minutes">60</expiry>
   </message>

This message corresponds to "Have Bob call me back as soon as his phone is free, but only in the next hour". This feature supports the move to remote server based storage of individual subscriber information allowing it to be made available to and from multiple devices as determined by the network provider, the subscriber, or both. For example, by means of the call method described here, the person requested, Bob, can be searched from data at the call center 122, or from an interface device 350.

Another feature of the invention is that the interface device 350 need not to be attached to the calling device. For example, a disposable device having the ability to receive calls, can obtain messages from any user interface device 350 such as a computer or PDA having an IP connection. Existing low functionality devices (like older mobile phones) can be augmented with new interfaces delivered by computer or PDA. In addition, many new services can be added requiring only changes to be made in the web server application or WAP interface without deploying new handsets.

Example 6

E-commerce, Revenue Generation, and Billing Services

The present invention 10 also provides a method for e-commerce, revenue generation, and billing services using existing network provided billing systems and infrastructure and still protecting the subscribers information. These features are made available to standard subscribers and pre-paid phone and card users. Through the context listing directory 128, all subscribers and users have access to their individual network provider 120. And the providers have access to the subscribers and users directly and through the system 10.

The present invention expands the transactional capability of a network provider system as follows:.
1. It allows the network provider and other utility providers to realize new revenue opportunities leveraging their billing system assets.
2. It allows the network providers to earn money on the float of money held until remitted to the e-commerce sites.
3. It allows consumers without credit cards to participate in online purchasing.
4. It enables new micro payment transaction channels because the network provider billing systems have a core competency of being able to aggregate a large number of small transactions. Consequently it becomes economically feasible to bill customers for internet and e-commerce purchases.
5. It allows Subscribers and Providers to participate in these transactions without putting customer information at risk.

The present invention 10 utilizes 'Single Sign In' and 'Wallet' technologies where a centralized server handles the sign in requests for multiple sites, or provides centralized Wallets such as Microsoft Passport and Wallet. At sign up or account modification the subscriber completes the online contract and ensures their details are correct. The sign in method for establishing a Contextual Listing and/or this online contract has a Trust relationship with the sign in method's above. Affiliate retail web sites will enable this payment type on their sites to increase their volumes. When a purchase of this type is made the transaction is recorded by the Sign In Authority or Wallet Provider.

In order to fall understand the steps, a sample transaction is provided.

Set up

Figure 11:
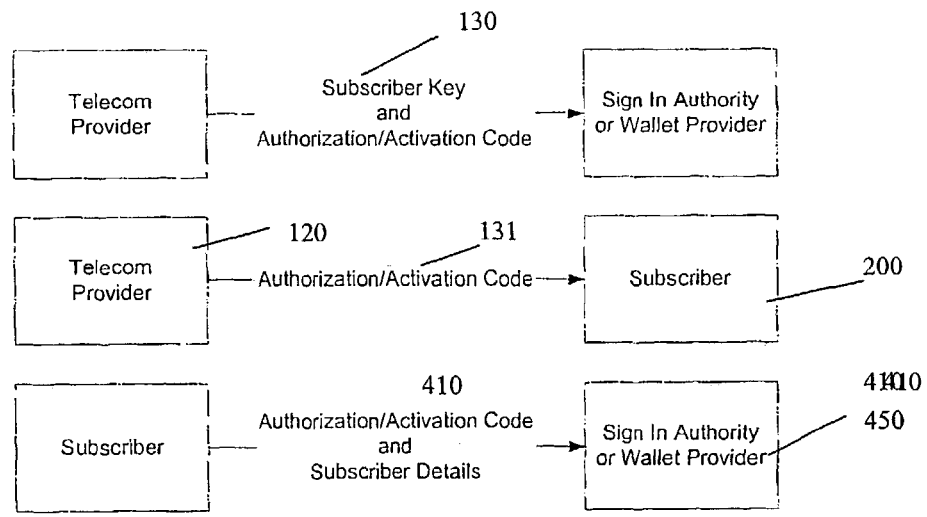
FIG. 11 is a flow diagram illustrating the setup process of a method for e-commerce, revenue generation and billing services, in accordance with one embodiment of the present invention, the setup process establishing relationships between a subscriber, a network provider and a sign in authority.

The setup process as shown in FIG. 11 establishes the relationship between the subscriber 200, the network provider or network provider 120 (the billing channel) and the sign in or wallet authority 450. Each network provider 120 provides a subscriber security or account key 130 as well as an authorization code 131. The subscriber 200 is provided with the authorization code 131, which ensures that only the subscriber can activate its account. The subscriber 200 can redeem the activation code 131 with the sign-in authority or wallet provider 450.

Authentication

Figure 12:
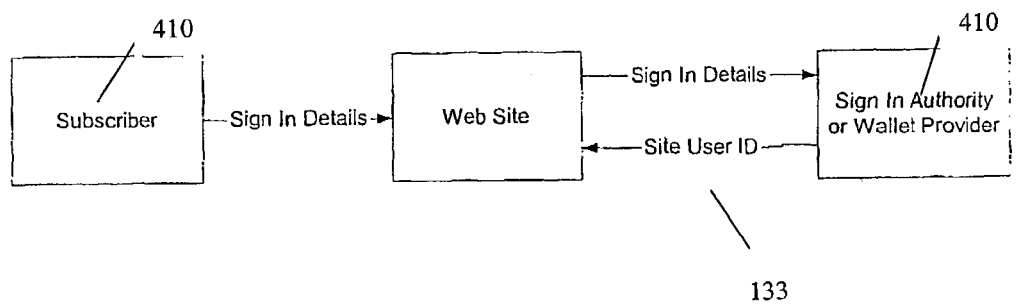
FIG. 12 is a flow diagram illustrating an authentication process for the method of e-commerce transactions of FIG. 10, providing for secure transactions by establishing a relationship between a subscriber, a network provider, and a sign-in authority.

During the e-commerce session the subscriber 200 must authenticate 420 itself to either the sign-in authority or wallet 450, as shown in FIG. 12. This might be done at the beginning of the e-commerce session or during the payment process 440. To the subscriber 200 it may appear that it is signing into the e-commerce site but it is actually being authenticated on either the sign-in authority or the wallet provider 450. The sign-in authority 450 would return back a user ID 133 to track the subscriber 200.

Figure 13:
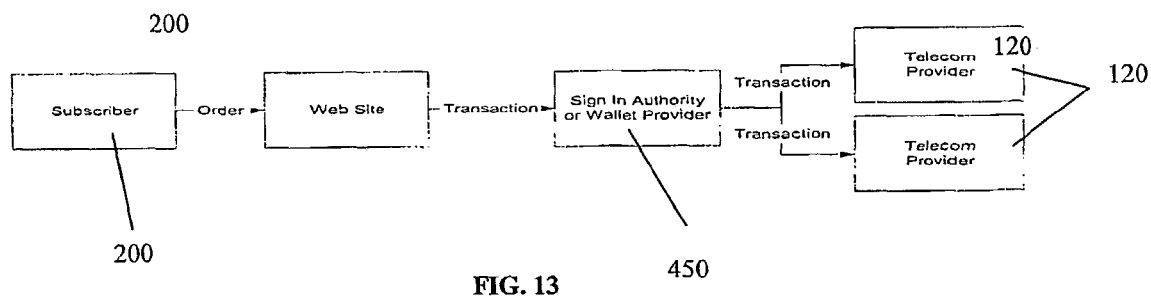
FIG. 13 is a flow diagram illustrating a transaction process for the method of e-commerce transactions of FIG. 10.

When a transaction 430 is made, the transaction details are recorded by the web site and passed back to the wallet or sign-in authority 450, as shown in FIG. 13, where the details are routed to the appropriate network provider 120.

Figure 14:
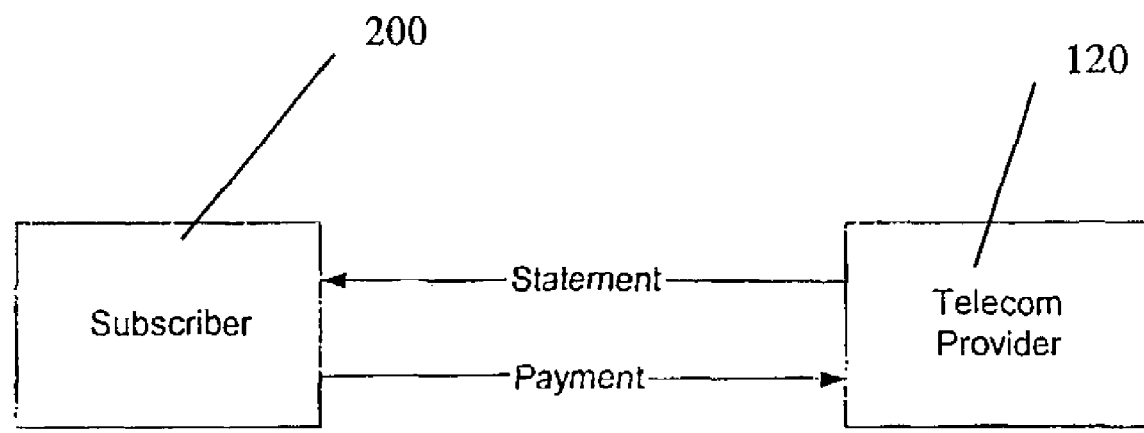
FIG. 14 is a flow diagram illustrating a bill presentation and payment process for the method of e-commerce transactions of FIG. 10.

The network provider 120 aggregates the transactions and presents them to the subscriber 200 in a monthly bill, as shown in FIG. 14.

Figure 15:
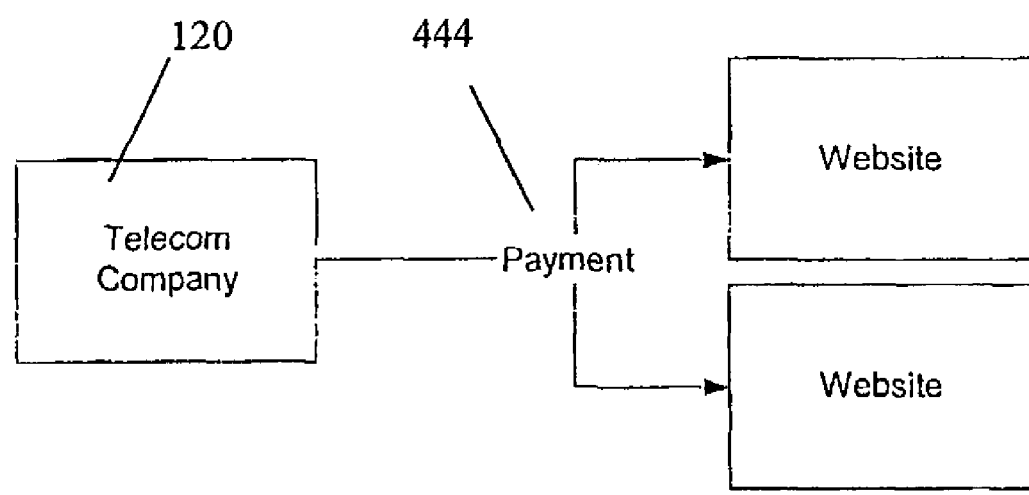
FIG. 15 is a flow diagram illustrating network provider compensation for executing the transaction in the method of e-commerce transactions of FIG. 10.

In the final step of the transaction, as shown in FIG. 15, the network provider extracts a fee 444 for executing the transaction.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for directory service and e-commerce across multi-provider networks, the method comprising the steps of:
    establishing a first list of secure identity keys at a call center, wherein a secure identity key is assigned to each subscriber and has associated thereto at least one context of the respective subscriber, wherein the at least one context is a predetermined characteristic of the respective subscriber, and wherein the secure identity key includes information identifying a service provider of the respective subscriber;
    establishing a second list of respective secure identity keys at the service provider of each respective subscriber, wherein each secure identity key at the service provider of each respective subscriber has associated thereto a contact number or address of the respective subscriber;
    receiving a call at the call center from a user requesting access to a targeted subscriber by providing at least one context associated to the targeted subscriber;
    performing a search of the first list at the call center using the at least one context provided by the user and identifying from the first list the secure identity key associated with the at least one context; and
    forwarding the identified secure identity key to the service provider identified by the secure identity key, wherein the service provider identified by the secure identity key uses the identified secure identity key to search the second list and retrieve from the second list a contact number or address of the targeted subscriber associated with the identified secure identity key, without requiring exposure of the contact number or address of the targeted subscriber to the call center, whereby the service provider facilitates a communication connection between the user and the targeted subscriber.

2. A method for providing a user with a communication connection to a subscriber over a communication network, the network including:
    a call center in communication with a contextual database, the contextual database storing a secure identity key for each respective subscriber and at least one context associated with each secure identity key, wherein each secure identity key includes information identifying a service provider of the respective subscriber; and
    at least one service provider in communication with a subscriber database, the subscriber database storing subscriber contact information associated with each secure identity key, the at least one service provider also communicating with the call center;
    the method comprising the steps of:
    (a) receiving from a user at the call center a context for a targeted subscriber;
    (b) using the call center to search for the context and retrieve the associated secure identity key from the contextual database without requiring use of, and without requiring exposure of, contact information of the targeted subscriber;
    (c) forwarding the retrieved secure identity key to the service provider identified by the retrieved secure identity key;
    (d) using the service provider identified by the retrieved secure identity key to retrieve from the subscriber database contact information of the targeted subscriber corresponding to a search for the retrieved secure identity key; and
    (e) providing the user a communication connection to the targeted subscriber without requiring that the subscriber contact information be released to the user, and without requiring that the subscriber contact information be released to the call center.

3. The method according to claim 2, wherein the context does not include contact information of the targeted subscriber.

4. The method according to claim 2, wherein the contact information for the targeted subscriber is not released from the service provider identified by the retrieved secure identity key.

5. The method according to claim 2, wherein the respective subscribers are cellular telephone subscribers and the contact information of the targeted subscriber is a cellular telephone number.

6. The method according to claim 2, wherein, in step (e), the communication connection is not provided to the targeted subscriber by the call center.

7. The method according to claim 2, wherein the service provider identified by the retrieved secure identity key is a communication provider network of the targeted subscriber.

8. A communication system for providing a user with a communication connection to a subscriber, the system including:
- a call center adapted to receive a context for a targeted subscriber as provided by a user, the call center including a contextual database which stores a secure identity key for each respective subscriber and at least one context associated with each secure identity key, the secure identity key including information identifying a service provider of the respective subscriber, whereby, in response to a context received, the call center searches for the context and retrieves the associated secure identity key from the contextual database without requiring use of, and without requiring exposure of, contact information of the targeted subscriber; and
- a service provider which is in communication with a subscriber database storing subscriber information and with the call center, whereby, in response to the retrieved secure identity key, the service provider searches for the secure identity key and retrieves from the subscriber database contact information of the targeted subscriber facilitating a communication connection of the user to the targeted subscriber, without requiring that the contact information of the targeted subscriber be released to the user, and without requiring that the contact information of the targeted subscriber be released to the call center.

9. The system according to claim 8, wherein the context does not include contact information of the targeted subscriber.

10. The system according to claim 8, wherein the contact information for the targeted subscriber is not released from the service provider.

11. The system according to claim 8, wherein the respective subscribers are cellular telephone subscribers and the contact information of the targeted subscriber is a cellular telephone number.

12. The system according to claim 8, wherein the communication connection is not provided to the targeted subscriber by the call center.

13. The system according to claim 8, wherein the service provider is a communication provider network of the targeted subscriber.

14. The system according to claim 8, wherein the communication connection is provided to the targeted subscriber by the service provider.

15. The method according to claim 1, wherein the context does not include the contact number or address of the targeted subscriber.

16. The method according to claim 1, wherein the contact number or address of the targeted subscriber is not released to the call center.

17. The method according to claim 1, wherein the targeted subscribers are cellular telephone subscribers and the contact number of the targeted subscriber is a cellular telephone number.

18. The method according to claim 1, wherein the service provider identified by the secure identity key is a communication provider network of the targeted subscriber.

19. The method according to claim 2, wherein, in step (e), the communication connection is provided to the targeted subscriber by the service provider identified by the secure identity key.

* * * * *